United States Patent [19]
Hurst

[11] 3,798,370
[45] Mar. 19, 1974

[54] ELECTROGRAPHIC SENSOR FOR DETERMINING PLANAR COORDINATES

[75] Inventor: George S. Hurst, Oak Ridge, Tenn.

[73] Assignee: Elographics, Incorporated, Oak Ridge, Tenn.

[22] Filed: Apr. 17, 1972

[21] Appl. No.: 244,629

[52] U.S. Cl. .................................................. 178/18
[51] Int. Cl. .............................................. G08c 21/00
[58] Field of Search .............................. 178/18, 19, 20

[56] References Cited

UNITED STATES PATENTS

| | | | |
|---|---|---|---|
| 3,632,874 | 12/1969 | Malavard | 178/18 |
| 3,449,516 | 1/1965 | Cameron et al. | 178/18 |
| 3,005,050 | 1/1956 | Koenig, Jr. | 178/20 |
| 3,670,103 | 6/1972 | Baxter | 178/19 |
| 3,662,105 | 5/1970 | Hurst | 178/18 |

FOREIGN PATENTS OR APPLICATIONS

| | | | |
|---|---|---|---|
| 588,043 | 5/1947 | Great Britain | 178/20 |

*Primary Examiner*—William C. Cooper
*Attorney, Agent, or Firm*—Martin J. Skinner

[57] ABSTRACT

An electrographic sensor for determining planar coordinates with good resolution, e.g., about 0.1 mm, and an overall accuracy of about 0.4 mm. A rectangular single sheet of extremely uniform resistive material has a row of small electrodes arranged along each edge with discrete resistors connected between adjacent electrodes of each row so as to form resistor networks along each edge of the resistive sheet. A switching circuit applies a voltage across the resistive sheet by applying one polarity to both ends of the resistor network of one edge and the opposite polarity to both ends of the resistor network at an opposite edge. At a desired time interval, voltage is switched to the second set of resistor networks so as to produce orthogonal electric fields in the resistive material during mutually exclusive time intervals. The sensor is contacted with probe at selected points to produce voltage signals which are proportional to the coordinates of any such points. Specific embodiments are described for punched-card reading, the preprogrammed interpretation of graphical data, and the movement of a probe across the sensor to produce continuous contacting for many applications.

16 Claims, 9 Drawing Figures

ELECTROGRAPHIC SENSOR FOR DETERMINING PLANAR COORDINATES

BACKGROUND OF THE INVENTION

There are many fields of technology wherein it is desirable to generate electrical signals which are proportional to some physical point in a planar coordinate system. For example, it is often desirable to accurately reconstruct graphs or other technical data representation, or to store the data in computers, tape storage, or the like. In other fields, it is often desired to "read" coded data contained on punched cards. These are typical applications of what generally may be classed as graphical data processing. In still another applicable field, continuous writing generates signals for reproducing this writing at some other location as in telautography.

Numerous devices have been devised that are acclaimed to solve individual of these and similar applications. One of the earlier of these devices is shown and described in U. S. Pat. No. 2,269,599 to H. C. Moodey. Another of the typical prior art single layer x-y position sensitive devices is that described in a booklet entitled "Information Display Concepts," distributed by Tektronics, Inc. (1968), and referred to as an "x-y tablet." Still another is the device described in U. S. Pat. No. 2,900,446 to D. J. McLaughlen, et al., In all of these devices, continuous electrodes are placed along each edge of a resistive sheet and various means are described for applying voltages between the electrodes to obtain the necessary orthogonal electrical fields. These same electrodes, however, cause severe distortion to the electrical fields during the time interval when they are not connected to the voltage supply. This restricts the use to only a small central region of the resistive sheet for accurate determinations of point coordinates.

The device described in U. S. Pat. No. 3,449,516 to S. H. Cameron, et al., is designed to reduce the field distortion caused by the continuous electrodes. Switching devices are used with each of several discontinuous electrodes to effect application of electric potentials to a resistive sheet. Each electrode is completely isolated from others when no voltage is being applied. Still another proposed solution to the problem of distortion is the device described in U. S. Pat. No. 3,591,718 to Shintaro Asano. In his device, the resistive sheet is framed with strips of a material having a lower resistivity than the sheet. The potentials for producing the electrical fields are applied to electrodes at the corners of the frame. The potential at any position along the edge, however, is affected by the quality of the contact between the strips and the sheet and the uniformity of the resistivity of the strips.

In addition to these single layer devices, there are known to be many multilayer graphical input tablets for generally accomplishing the desired results. Typical is the device disclosed in my copending patent application with J. E. Parks, Ser. No. 39,353, filed May 21, 1970.

None of the above-described devices, or others known to me, are universally applicable to all types of graphical data processing because of one or more deficiencies of accuracy, linearity, durability or simplicity.

SUMMARY OF THE INVENTION

My invention in its simplest form utilizes a single rectangular sheet of resistive paper having a highly uniform electrical resistivity throughout which is provided with a row of a plurality of small individual electrodes along each edge and a small electrode in each corner, all electrodes being in electrical contact with the resistive paper. Discrete resistors are connected between adjacent electrodes in each row with resistor values depending on the configuration of the spot electrodes. Switching circuits are provided to apply a voltage between the electrodes of one row and the electrodes of the row along the opposite edge of the paper, and whereby a voltage may also be applied alternately, during a mutually exclusive time period, between the other two rows of electrodes on the other edges of the paper to produce orthogonal electric fields in the resistive paper. A moveable probe is provided to contact the paper at a selected point, or series of points, whereby a voltage signal is derived between the point of contact and a reference potential, that is accurately proportional to the *x*- and *y*-coordinates of the point or points. The contacting of the resistance paper takes place either through the probe itself or through a conductive sheet brought into contact with the resistive paper by the probe.

DETAILED DESCRIPTION

Figure 1:
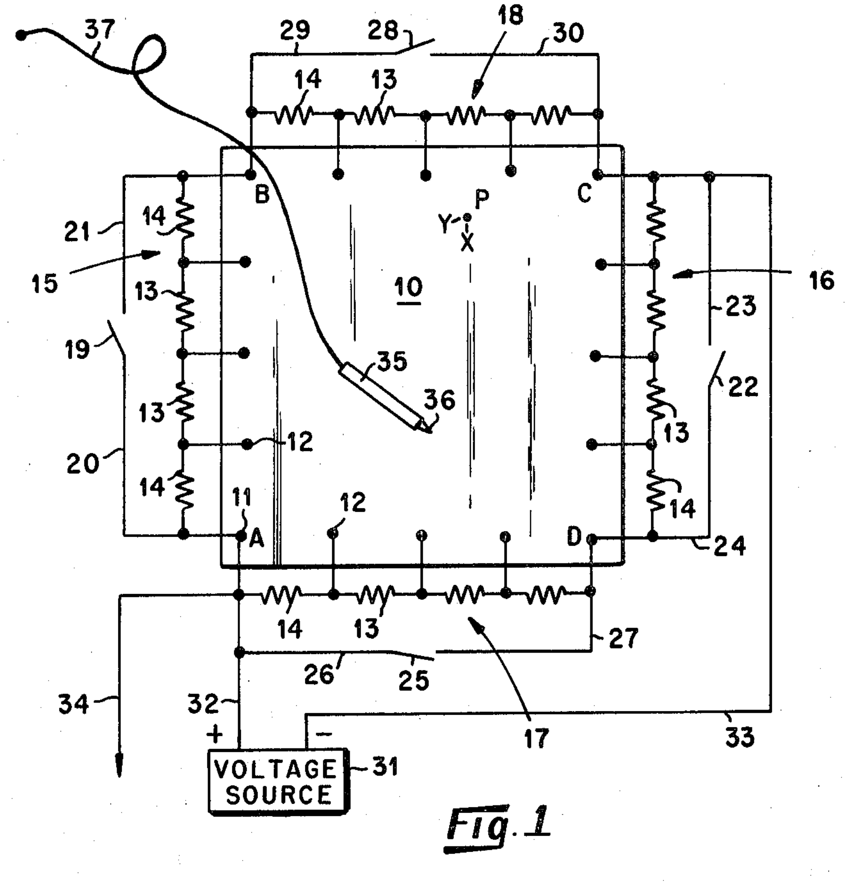
FIG. 1 is a schematic diagram of the most elementary form of my invention as utilized in a simplified circuit.

The underlying principle of my invention may be explained through the use of FIG. 1. A uniform resistive sheet 10 is suitably mounted by any conventional means to a support (not shown) so as to form a flat plane. This resistive sheet may be, for example, distributive resistance paper, Type L, manufactured by Knowlton Bros., Watertown, N. Y., having a resistance of 1,000 to 2,000 ohms per square. For my use, I prefer paper having 2,000 ohms per square with highly uniform electrical resistivity throughout the sheet. In each corner of sheet 10 are spot electrodes 11 as at points A, B, C, and D. Spaced in between the corner spot electrodes, in a row-like manner, are edge spot electrodes 12 along each edge of sheet 10. Three edge electrodes along each edge are shown for illustration; an actual sensor may have more or less for a particular size and application.

All the spot electrodes 11 and 12 may be metal contacts electrically attached to sheet 10 or may be produced by applying conductive paint or the like in, for example, small circles. The electrode size must be small with respect to the spacing between electrodes. The diameter of each spot may be typically 1/32 to 1/8 in., and the spacing between spot electrodes in each row may be typically 1 to 2 inches. While these are not limiting dimensions, their effect will be described hereinafter. The spacing between spots may be varied; however, a uniform spacing is most convenient for manufacture.

Connected between adjacent edge spot electrodes 12 are individual discrete high precision (e.g., 0.1 to 1.0 percent) resistors 13 all having equal resistance of, for example, 50 ohms. Connected between a corner spot electrode 11 and the first spot edge spot electrode 12 of each edge of resistive sheet 10 is a resistor 14 having a higher resistance value, e.g., 75 ohms, if the electrode spacing is uniform along each edge. All resistors 14 have the same value. The particular value for these resistors 13, 14 depends upon the resistivity of the sheet 10, and the ratio of the value of resistors 14 to resistors 13 depends upon the electrode size and separation distance. For larger spot electrode sizes, the ratio approaches unity. The resistor values cited are suitable for 2,000 ohms/square material with 1/16 in. spot electrodes spaced two inches apart. The resistors 13 and 14, in series along each edge, form four resistor networks 15, 16, 17 and 18, joined to electrodes 11 at points A, B, C and D. It will be recognized that this structure, using discrete resistors, permits the choice of preferred precision resistive elements to assist in the establishment of uniform electrical gradients in the resistive paper, as described below.

Figure 3:
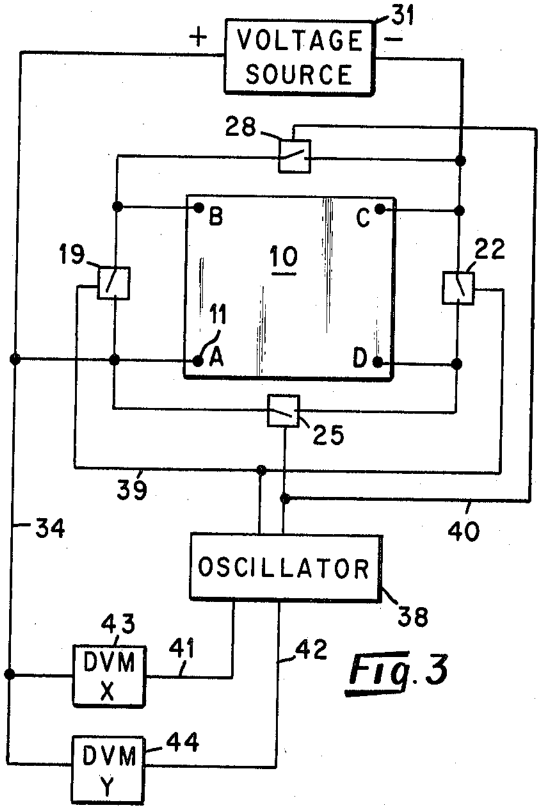
FIG. 3 is a block diagram of a switching system utilized in my invention.
Figure 4:
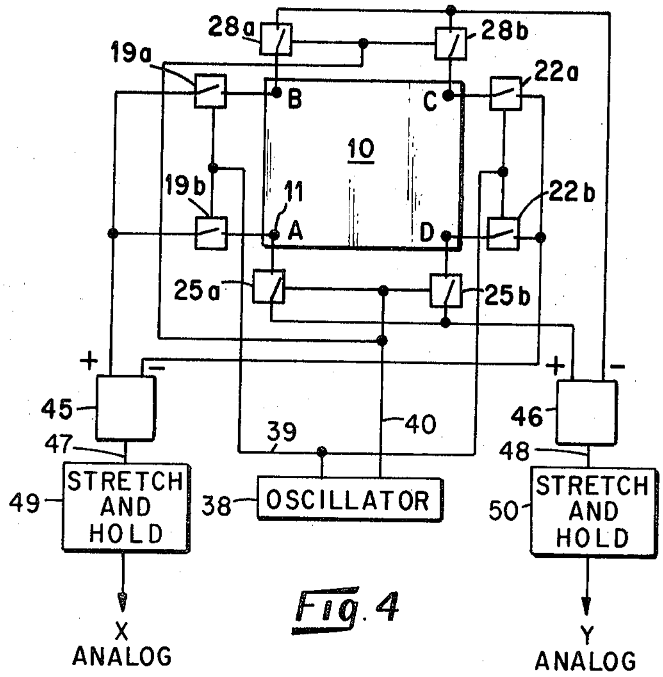
FIG. 4 is a schematic circuit diagram of a preferred switching arrangement for applying potentials to the resistor networks of FIG. 1.

In parallel with resistor network 15 is switch 19 which is connected to points A and B with leads 20, 21, respectively. Similarly, switch 22 is joined across resistor network 16 to points C and D with leads 23, 24; switch 25, across network 17, is joined to points A and D with leads 26, 27; and switch 28 is connected between points B and C, across network 18, with leads 29, 30. Switch 19 and switch 22 are interconnected for simultaneous operation as shown in FIGS. 3 and 4. Switches 25 and 28 are likewise interconnected for simultaneous operation.

The positive terminal of a fixed voltage source 31 is connected to lead 26 (or point A, a corner electrode 11) by lead 32, while the negative terminal is connected to lead 23 and thus point C (another corner electrode 11) by lead 33. Dual voltage sources also may be utilized, as illustrated in FIG. 4. A lead 34 connected to point A may be used for obtaining signals proportional to $x$- and $y$-coordinates or may be connected to a reference potential. A moveable probe 35, with a conductive contact 36 connected to lead 37, is provided to contact sheet 10 at any point P, having planar coordinates $x$, $y$. The lead 37 may be connected to a reference potential (which may be the circuit ground) if lead 34 is connected to a voltage measuring means. If lead 34 is connected to the reference potential, lead 37 is connected to the signal measuring means.

The shorting switches 19, 22, 25, and 28 may be reed-type relays or the like for moderate speed operation; however, for high-speed operation they are preferably electronic solid state devices such as COS/MOS quad-bilateral switches, Model CD-5016, manufactured by Radio Corporation of America, Princeton, N. J. The supply 31 may be any regulated d. c. source from, for example, 1 to 20 volts. Preferably, this is a mercury battery of about 4 volts.

In a normal operation of this embodiment, switches 19 and 22 are closed, with switches 25 and 28 being open, so as to connect the positive terminal of source 31 to points A and B and the negative terminal to points C and D. All spot electrodes 12 along resistor network 15 thereby have substantially the same potential as points A and B. Also, all electrodes 12 along resistor network 16 have substantially the same potential as points C and D. Accordingly, a very uniform electric field is produced across the sheet 10 and transverse equipotential lines are thereby formed in the sheet. Because switches 25 and 28 are open, resistor networks 17 and 18 assist in establishing these uniform equipotential lines; i.e., these two sets of series resistors serve as voltage dividers. An essential feature of my invention is the fact that the symmetrical array of spot electrodes discussed above allows for the resistances to remain connected between spot electrodes; only the four corner spot electrodes 11 are involved in the switching operation. Furthermore, the roles of resistor networks 17 nd 18 trade with those of the networks 15 and 16 between cycles. On the half of the cycle used to generate an $x$ signal, resistor networks 15, 16 supply potentials to the spot electrodes along the $y$ direction, while the networks 17, 18 act as voltage dividers helping to maintain uniform gradients in the $x$ direction. On the half of the cycle used to generate a $y$ signal, resistor networks 17, 18 provide the potential to the spot electrodes 12 along the $x$ direction, while the networks 15, 16 act as voltage dividers helping to maintain uniform gradients in the $y$ direction.

Figure 2:
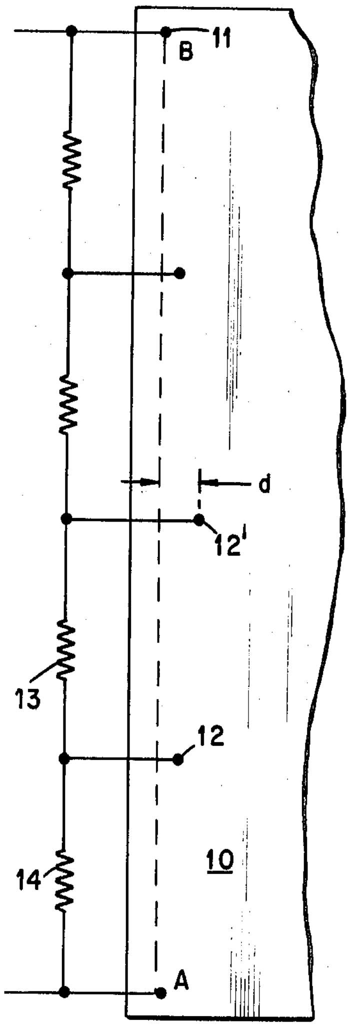
FIG. 2 is a drawing illustrating the preferred location of the electrodes shown in FIG. 1.

As stated above, all spot electrodes connected to a resistor network with a shorting switch closed have substantially the same potential. The only deviation is caused by a flow of current through resistors 13, 14, for example, due to the potential across resistive sheet 10. Exact potentials are required for most applications of the embodiment; therefore, corrections can be made by relocating the edge spot electrodes as shown in FIG. 2. The edge spot electrodes are displaced toward the center of sheet 10 a distance, $d$, so as to compensate for the abovedescribed voltage drop through the resistors. Thus, electrode 12 is displaced from a line between points A and B a distance to overcome the potential drop through resistor 14, and electrode 12' is farther displaced to overcome the drop through resistor 14 and resistor 13 in series. The displacement distance is thus greatest for edge electrodes farthest from a corner electrode. The effective displacement distance is such that application of a potential across the resistive sheet, through the use of the opposite pairs of resistor networks, produces an equipotential line which is substantially parallel to the line joining the corner spot electrodes when the equipotential line is at least one spot separation from that line. The value of d for each edge electrode is determined from the approximate equation:

$$d = \Delta V/V \cdot S, \text{ where}$$

$\Delta V$ is the potential drop measured from a corner spot electrode to the particular spot electrode; V is the potential across the entire resistive sheet, and S is the distance between oppositely disposed rows of spot electrodes.

Referring again to FIG. 1, when the tip 36 of probe 35 is brought into contact with sheet 10, as at point P, the sheet is at the reference potential, e.g., grounded, at the point. Because the system is otherwise floating except through the probe 35 and lead 37, a signal representative of one coordinate, e.g., the x-coordinate, of point P is available between output lead 34 and the reference potential. The potential difference (output signal) may be measured, for example, with a digital voltmeter (see FIG. 3) or may be fed into data storage or utilization systems. Alternately, lead 34 may be connected to the reference potential and lead 37 to the digital voltmeter, as stated above.

A signal proportional to the second coordinate, e.g., the *y*-coordinate of point P, is obtained by opening switches 19 and 22 and closing switches 25 and 28. This produces an electric field in sheet 10 which is orthogonal to the field produced in the previous switch condition. The switching may be repeated at a given frequency or may be intermittent depending upon the particular application of the embodiment. The switching may be programmed in a particular sequence if desired to meet some external requirements. This will be discussed further with reference to other embodiments for specific applications.

In order to demonstrate the accuracy of my invention, a 12 × 12 inch sheet of 2,000 ohms per square resistive paper was mounted on a firm nonconducting backing. Spot Electrodes were placed along each side, in a curved alignment as discussed above, within about ¼ in. of the edge of the sheet and spaced two inches apart. These electrodes were produced with silver paint placed in circles of 1/16 in. diameter. Resistors of 50 ohms were joined between adjacent electrodes and 75 ohms between the corner electrodes and the first edge electrode. All resistors had a precision of 1.0 percent or better. The circuits were connected as shown in FIG. 1 to a 1.5 volt battery. The voltage signal appearing on lead 34 was measured by a digital voltmeter, Model 340A, manufactured by Digilin, Inc., of Glendale, California, to three decimal places.

An accurate grid (not shown) was placed on the resistive sheet 10 to determine precise positions over the surface. The sheet 10 was then contacted with probe tip 36 (at ground potential) at several individual positions and the voltage output signal, to ground, on lead 34 noted. At distances from a line between corner electrodes equal to or greater than the separation between electrodes in the row, the equipotential lines were uniform to within ±0.1 percent. Variations of only up to ±1.0 percent were observed when the distance from the line was one-half the electrode spacing. Other tests with spot electrodes as small as 1/32 in. produced similar results, while electrodes significantly greater than ⅛ in. increased distortion at larger spacings from the rows of electrodes.

The operation of switches 19, 22, 25 and 28 has been referred to above in connection with the production of orthogonal electric fields in the resistive sheet 10 and the production of appropriate signals proportional to *x*- and *y*-coordinates of a point during mutually exclusive time intervals. A block diagram for electrically accomplishing this switching is shown in FIG. 3. An oscillator 38 provides a switch operating signal through lead39 to the switches 19 and 22, and through lead 40 to switches 25 and 28. During one half cycle of the oscillator 38, switches 19 and 22 are closed and switches 25 and 28 are open: the opposite operation occurs during the other half cycle. An appropriate read/hold signal is transmitted from the oscillator 38 through leads 41, 42 to two digital voltmeters 43, 44. Thus, when switches 19 and 22 are closed, digital voltmeter 43 reads (and holds, if desired) the voltage on output lead 34 which is proportional to the x-coordinate of a point on resistive sheet 10. When the switches are again operated to close switches 25 and 28, digital voltmeter 44 reads (and holds) the voltage on lead 34 which is now proportional to the y-coordinate of the same point on the resistive sheet 10. For the various applications of my invention, the oscillator 38 frequency may be changed as well as the symmetry of the half-cycles to provide a desired switching sequence. Since digital voltmeters can respond to only some thirty signals per second, reed-type relay switches are sufficiently fast for this embodiment.

It will be recognized by those versed in the art that the abovecited COS/MOS switches, and similar devices, often exhibit ohmic resistance in the closed position. The resistance between each of the contacts of a chip of four switches are nearly equal, however. The circuit shown in FIG. 4 overcomes the effect of this internal switch resistance. The resistive sheet 10 is shown with the four corner electrodes 11 at points A, B, C and D. For simplicity, the resistor networks 15, 16, 17 and 18 (of FIG. 1) are not shown and no edge electrodes are shown. The switch across resistor network 15 is divided into two parts **19*a* and 19*b* which are operated simultaneously via a signal on lead 39 from oscillator 38, to apply the positive side of source 45 to both points A and B. Also, switches 22*a* and 22*b* simultaneously connect points C and D to the negative side of supply 45. Switches 19*a*, 19*b*, 22*a* and 22*a* are contained in one switch chip and therefore have substantially identical resistance when closed. Thus, any voltage drop occurs at all corners of the resistive sheet 10. In a like manner, switches 25*a*, 25*b*, 28*a* and 28*b* are contained in one chip and apply the voltages to the corner electrodes 11 at the appropriate time intervals governed by oscillator 38**.

This circuit diagram illustrates the use of two voltage sources 45, 46 for producing the separate x and y fields in resistive paper 10. These sources may include reference potentiometers so that the voltages on leads 47, 48 are the desired difference voltages proportional to the *x*- and *y*-coordinates of a point on sheet 10. Because solid state switches potentially may be operated at high frequencies, the output voltages on leads 47, 48 are fed into conventional stretch-hold circuits 49, 50 to thereby produce analog signals of the two coordinates.

Figure 5:
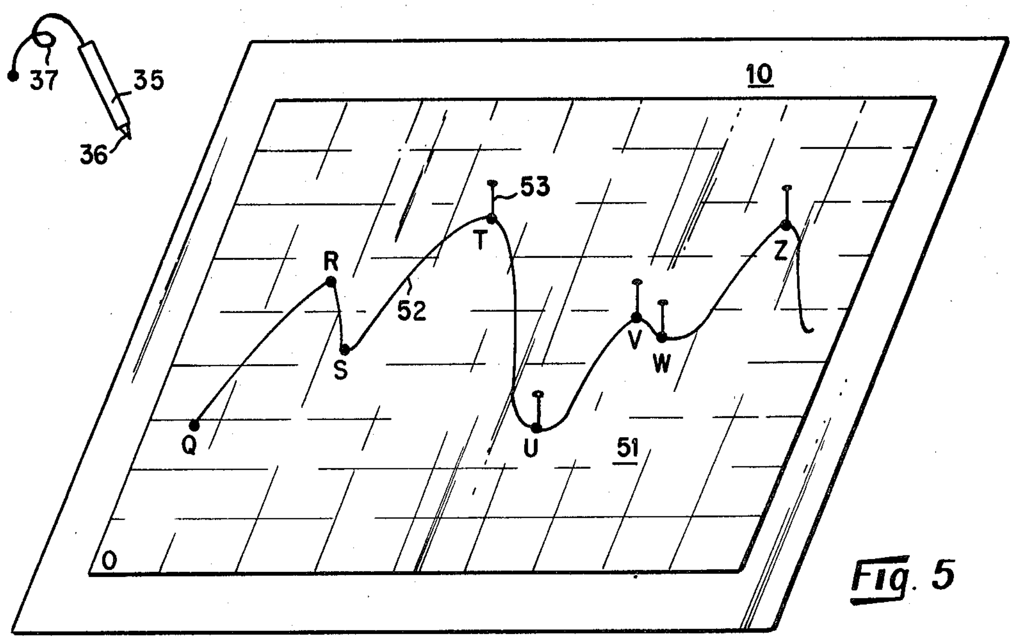
FIG. 5 is a schematic drawing illustrating an embodiment of my invention where the coordinates of a plurality of points are to be determined sequentially.

An embodiment substantially like that of FIG. 1 may be used for several types of data processing. One such application is the transcribing of data from a graphical representation into digital information for storage, for the reproduction of the data at a remote position, or for treatment by a computer in any manner. In such applications, a paper 51 containing a graphical representation 52 thereon is placed upon resistive sheet 10 as shown in FIG. 5, with the $x$- and $y$-axes aligned appropriately (for simplicity, no electrodes or resistors are shown in this FIG. 5). A "zero" for the $x$ and $y$ signals is obtained by penetrating paper 51 with probe tip 36 at the "origin," 0, or equivalent, of the graph and an adjustment made by any conventional electrical means, such as that described in U. S. Pat. No. 2,900,446, Col. 2, line 55. Thereafter, the probe point 36 is passed through paper 51 to contact resistive sheet 10 at points such as at Q, R, S, whose coordinates are to be determined. Automatic or manual operation of the switches of FIG. 1 (or FIG. 3) produces output signals proportional to the desired coordinates. If automatic, the switches would be operated at a rate of at least a few cycles/sec.

As a variation in graphical data analysis, conductive pins 53 may be inserted at points such as T, U, and V on paper 51 to contact resistive sheet 10. Using a flexible probe tip 36, the probe 35 may be swept across the device in a programmed manner so that tip 36 contacts all pins 53. With rapid operation of the switches, e.g., several kilocycles per second, as accomplished with the circuit of FIG. 4, the coordinates of any pin 53 will be determined. By these means, basic analog data may be stored in memory units for later retrieval, or mathematical computations may be performed to determine, for example, the slope of a line between the two points V and W. Minima and maxima may be averaged and/or standard deviations from other data or theory may be accurately determined. Programmed devices, such as desk calculators, may be interfaced to be used for these and other computations.

Another utilization of my invention is in the form of a card reader. Many types of information are recorded on punched cards such as those used in the "Termatrix" system of Remac International Corp. Each card in their system contains information, coded by position, such as the numbers of technical reports and key words for information retrieval in the form of perforations in one or more of 10,000 positions (100$x$ and 100$y$ locations). Cards of other systems may have other combinations of perforations. The card may be placed upon a resistive sheet 10 in the same manner as the coordinate paper 51 of FIG. 5, and probe tip 36 passed through a perforation to contact sheet 10 to obtain the coordinates of that perforation position. It is desirable for this application to make a modification to the logic circuits of the measuring digital voltmeters (see FIG. 3) so that they hold the voltage reading for the coordinates until another location is sought. This technique is well known in the art. If desired, a plurality of probes may be passed across the card to scan parallel rows of perforations. If the scan is in the $x$-direction, all values of y having perforations will also be determined. In some applications for information retrieval, two or more cards are placed in overlapping relationship and the probe may then be used to determine the coordinates, and thus the stored information, at aligned perforations.

In addition to the above-cited applications which require more than a moderate degree of accuracy, my invention has sufficient accuracy for use in obtaining signals to assist in tape-controlled machining. A tracing of a mechanical design, or a model, may be placed upon the resistive sheet 10 and the coordinates of, for example, the centers for boring holes may be obtained either for storage in a computer memory or for direct use in positioning tools on an actual work piece. Other features of a design may be located similarly, or the continuous contour may be determined accurately.

Figures 6, 7, 8:
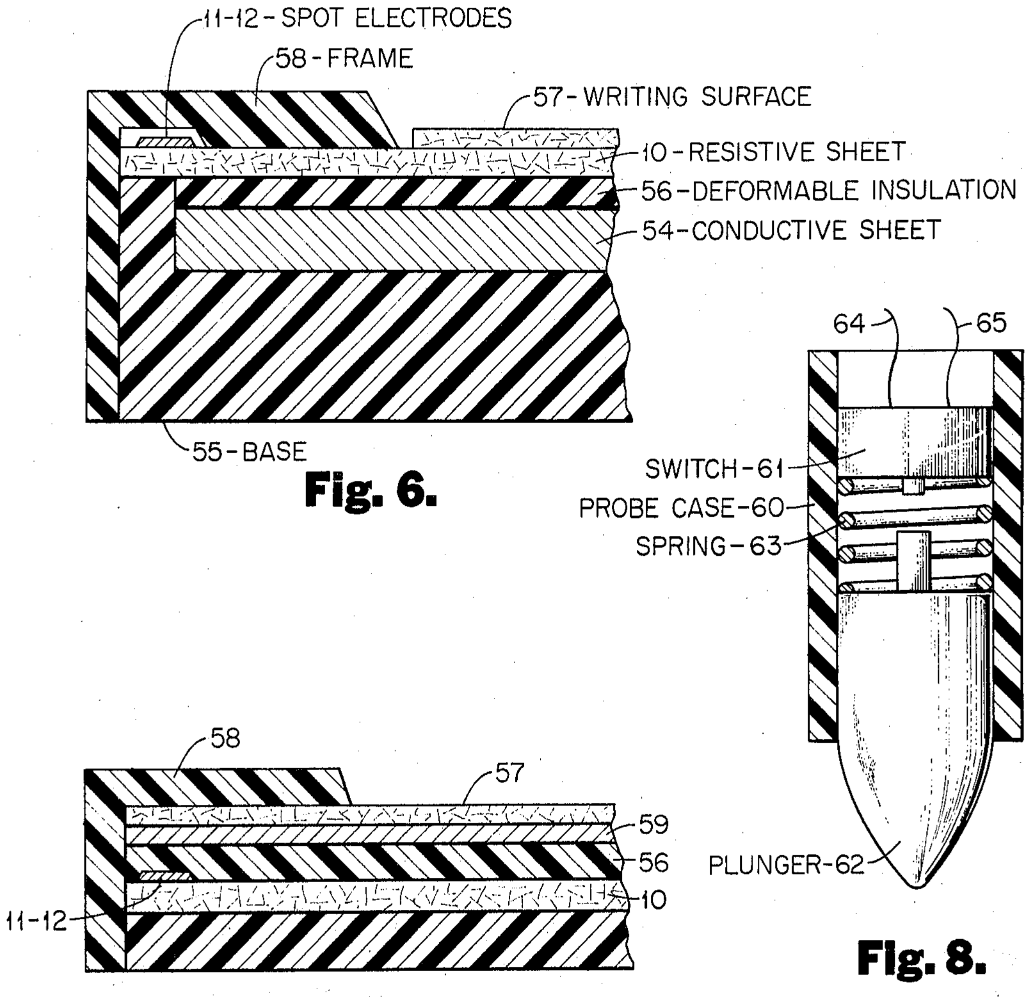
FIG. 6 is a cross sectional drawing of an embodiment of the invention for the continuous writing or tracing of information.
FIG. 7 is a cross sectional drawing of another form of construction of the embodiment of FIG. 6.
FIG. 8 is a cross sectional drawing of a pressure-sensitive probe that may be used with all of the embodiments of the invention.

There are many corresponding applications where it is undesirable to pierce an overlying sheet, particularly where speed of data processing is important and where essentially a continuous series of points (a line) is to be analyzed or information relating thereto is to be transmitted to an output device. An embodiment of my invention for these applications is illustrated in FIG. 6. As in the other applications, resistive sheet 10 is supported on a stiff backing 54 which may be supported by an insulated base 55. In this configuration, backing 54 is a conductive plate such as aluminum. Spot electrodes 11, 12 are placed along the edges of sheet 10, with interconnecting resistors, in the manner described above. Separating sheet 10 from backing 54 is a thin layer of a deformable insulation 56 such as a finely woven fabric, a grease, a gel or a material providing the function described hereinafter. Particularly suitable for this insulation layer 56 is a dielectric gel "Sylgard 51," marketed by Dow-Corning Co. of Midland, Michigan. This material is applied by painting the liquid form of the gel upon the aluminum plate 54 and curing at 300° F for three hours. This produces a tough, deformable and self-healing insulation of about 0.003 in. thickness.

A second suitable deformable insulation is a fabric net. Specifically, a fine nylon net having threads of about 0.004 in. in diameter woven to form diamond-shaped openings of about 0.15 in. across, adequately separates the resistive sheet and conducting material for pressures over a general area but permits contact immediately under a point of pressure to within 0.002 in. Typical of such nylon net is Maline No. 1621 available from Paul's Veil and Net Corp., N. Y., N. Y.

Overlying the resistive sheet 10 is a writing surface 57 (or the sheet 51 of FIG. 5). A frame 58 covers the edges of the layers and defines the region of high accuracy as described above. Any common writing instrument (not shown), such as a ball point pen, may be used to press or write upon surface 57. Pressure applied in this manner sufficiently deforms insulation 56 immediately below the point of pressure so as to bring resistive sheet 10 into contact with conductive backing 54 at that point. Utilizing conventional electronics, together with a circuit such as illustrated in FIG. 4, $x$- and $y$-proportional signals may thus be produced for any point or line on surface 57.

These same functions may be accomplished using another embodiment wherein a flexible conductive sheet may be placed above the resistive sheet with the insulation therebetween. The writing surface would then be placed on top of the conductive sheet. This variation is illustrated in FIG. 7. As before, localized pressure applied to the writing surface 57 will bring about contact of a flexible conductive sheet 59 and the resistive sheet 10 immediately below the point of pressure. For this construction, a conductive plastic such as "Velostat" distributed by Customs Materials, Inc., of Chelmsford, Mass., is suitable. Although the plastic has a resistance of about 2,000 ohms per square, this is not deleterious as the input resistance of most measuring devices is typically much larger, e.g., $10^8 - 10^9$ ohms.

For these embodiments of FIGS. 6 and 7, the switches shown in FIGS. 1 and 4 must be operated at a high frequency if line drawing is done or continuous tracing is performed. The frequency can be of the order of $10^5 - 10^6$ cycles per second. The output analog signals may be sent to a transcriber where the points, or pattern drawn, on the surface 57 are reproduced. Alternately, they may be placed in storage for subsequent use. In such a manner, each of several sketches by an engineer may be stored until a final design is completed, for example. As above, the signals may be processed by a programmed calculator to compute desired information.

The aforementioned gel and net are particularly useful in the constructions shown in FIG. 6 and 7 because of their response to pressure. When even a light pressure is applied at a point on surface 57, these insulations 56 deform at only a small point to permit contact of resistive sheet 10 and the conductive sheet 54 (or 59). In contrast, general pressure over an area as that exerted by a hand holding the writing instrument will not cause penetration of the insulation 56 and thus there is no output signal.

For some of the applications of the embodiments of my invention, it may be desirable to only produce an output signal, or set of signals, at certain times even though the probe may be in continuous contact with the sensor unit. For example, as the probe is used to trace the contour of a model, signals may be desired at only certain distinguishing features of the model. Accordingly, the probe may be fabricated as illustrated in FIG. 8. Contained within a probe body 60 is a pressure sensitive normally open switch 61. Switch 61 is operated by plunger 62 which may be the same as probe tip 36 (see FIGS. 1 and 5). A spring 63 or other biasing means is used to normally keep plunger 62 fully extended from body 60. Leads 64 and 65 are used to connect switch 61 between probe tip 36, for example, and lead 37 of FIG. 1. In the case of a probe used with the embodiments of FIGS. 6 and 7, leads 64 and 65 may be used to connect the switch 61 between the conductive material 54 (or sheet 59) and the aforementioned reference potential. Thus, output signals are produced only when extra pressure is applied to the probe.

Figure 9:
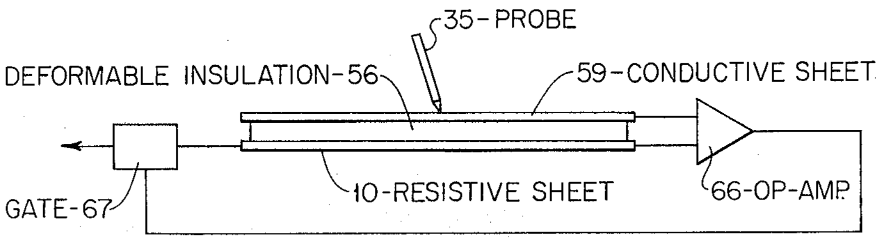
FIG. 9 is a schematic drawing of a pressure-sensitive system for use with the embodiments of FIGS. 6 and 7.

Another form of pressure-sensitive control of the output is illustrated in FIG. 9 which is applicable to the embodiments of FIGS. 6 and 7. In these embodiments, it may be desirable to distinguish between light contact between the resistive sheet 10 and the conductive sheet, i.e., when the plastic conductive sheet 59 may lack sufficient resiliency to immediately break contact from the resistive sheet 10. This pressure control may be accomplished using an operational amplifier 66, such as Model QFT-5, manufactured by Philbrick/Nexus Research of Dedham, Mass. The operational amplifier is connected to both the resistive sheet 10 and the conductive sheet 59 (or 54 of FIG. 6) with a voltage bias source not shown. When the resistance between these two layers is reduced to a preset value (determined by the bias) by sufficient pressure of the probe, the operational amplifier closes a gate 67, or similar device, whereby an output signal is available for reading, storage or computation.

Having described several embodiments of my invention, and applications therefor, it will be apparent that the basic electrographic sensor has many applications. I mean, by the term basic electrographic sensor, the resistive sheet and its associated spot electrodes and resistors. This basic unit may be used to achieve greater resolution and accuracy, with prior art circuits, in place of the prior art sensors. Furthermore, they are a separately marketable item for such uses, for sale to manufacturers of the total system, and for replacement units for users of my complete electrographic system.

I claim:

1. An electrographic sensor unit for use in determining the $x$ and $y$ planar coordinates of a point, which comprises:

a rectangular sheet of resistive material having a uniform electrical resistivity throughout the sheet;

corner spot electrodes in each corner of the resistive sheet in electrical contact therewith;

a plurality of spaced-apart edge spot electrodes along each edge of the resistive sheet in electrical contact therewith;

a plurality of discrete first resistors connected between adjacent of all of edge spot electrodes; and a plurality of discrete second resistors connected between the corner spot electrodes and adjacent edge spot electrodes whereby the first and second resistors form series resistor networks along each edge of the resistive sheet.

2. The sensor of claim 1 wherein each of the edge and corner spot electrodes is small with respect to the spacing therebetween; wherein the edge spot electrodes along each edge of the resistive sheet are equally spaced from each other of that edge and from the adjacent corner spot electrodes; wherein all of the first resistors are of equal resistance value; and wherein all of the second resistors are equal and each have a resistance value greater than the value of each of the first resistors.

3. The sensor of claim 2 wherein the corner and edge spot electrodes are circular and their diameter is about 1/16 inch; the spacing therebetween is from about 1 inch to about 2 inches; the resistivity of the resistive sheet is about 2,000 ohms per square; the first resistors are each of a value of about 50 ohms with a precision of at least 1.0 percent; and the second resistors are each about 75 ohms with a precision of at least 1.0 percent.

4. The sensor of claim 1 wherein each of the edge spot electrodes is individually displaced toward the center of the resistive sheet, from lines joining the corner spot electrodes, an effective distance such that application of an electrical potential across the resistive sheet by opposite pairs of the series resistor networks produces equal potential lines substantially parallel to the lines joining the corner spot electrodes whenever the equipotential lines are at least one spot electrode separation distance from those lines joining corner spot electrodes.

5. The sensor of claim 1 further comprising:

a voltage source having first and second output leads;

switches connected between the voltage source leads and the corner spot electrodes on the resistive sheet;

means for operating the switches sequentially whereby during a first time interval the first output lead of the voltage source is connected to both ends of one of a first pair of opposite series resistor networks along one edge of the resistive sheet and the second output lead of the voltage source is simultaneously connected to both ends of the other of the first pair of opposite series resistor networks along the opposite edge of the resistive sheet and whereby a second pair of opposite series resistor networks along the remaining edges of the resistive sheet function as voltage dividers during the first time interval, and during a second and mutually exclusive time interval the first output lead of the voltage source is connected to both ends of one of the second pair of opposite series resistor networks and the second output lead of the voltage source is simultaneously connected to both ends of the other of the second pair of opposite series resistor networks and the first pair of opposite series resistor networks function as voltage dividers thereby producing orthogonal electric fields having uniform equipotential lines in the resistive sheet;

a conductive probe for electrically contacting the surface of the resistive sheet at a point whose x and y planar coordinates are to be determined; and output means connected between the conductive probe and one corner spot electrode responsive to a potential difference between that corner spot electrode and the contacted point on the resistive sheet whereby separate electrical output signals are derived during the mutually exclusive time intervals that are accurately related to the *x* and *y* planar coordinate of the contacted point on the resistive sheet.

6. The sensor of claim 5 wherein the conductive probe includes a normally-open pressure sensitive switch in series with the probe and the output means whereby signals are obtained from the output means only when a preset pressure is exceeded between the probe and the surface of the resistive sheet to thereby close the pressure sensitive switch.

7. The sensor of claim 1 further comprising: a layer of a deformable insulation in contact with substantially all of one surface of the resistive sheet; and a sheet of conductive material spaced from the resistive sheet by the layer of the deformable insulation.

8. The sensor of claim 7 wherein the layer of deformable insulation is a fabric net, the threads thereof being about 0.004 in. in diameter and the threads being spaced apart about 0.05 to about 0.2 in.

9. The sensor of claim 7 wherein the layer of deformable insulation is a cured self-healing dielectric gel having a thickness of from about 0.002 to about 0.005 in.

10. The sensor of claim 7 wherein the conductive material is a conductive metallic sheet.

11. The sensor of claim 7 wherein the conductive material is a conductive plastic sheet.

12. The sensor of claim 7 further comprising: a voltage source having first and second output leads; switches connected between the voltage source leads and the corner spot electrodes on the resistive sheet; means for operating the switches sequentially whereby during a first time interval the first output lead of the voltage source is connected to both ends of one of a first pair of opposite series resistor networks along one edge of the resistive sheet and the second output lead of the voltage source is simultaneously connected to both ends of the other of the first of series opposite pair resistor networks along the opposite edge of the resistive sheet and whereby a second pair of opposite series resistor networks along the remaining edges of the resistive sheet function as voltage dividers during the first time interval, and during a second and mutually exclusive time interval the first output lead of the voltage source is connected to both ends of one of the second pair of opposite series resistor networks and the second output lead of the voltage source is simultaneously connected to both ends of the other of the second pair of opposite series resistor networks and the first pair of opposite series resistor networks function as voltage dividers thereby producing orthogonal electric fields having uniform equipotential lines in the resistive sheet; means for electrically contacting the resistive sheet and the sheet of conductive material at a point whose *x* and *y* planar coordinates are to be determined; and output means connected between the sheet of conductive material and one corner spot electrode responsive to a potential difference between that corner spot electrode and the sheet of conductive material whereby separate electrical output signals are derived during the mutually exclusive time intervals that are accurately related to the x and y planar coordinate of the contacted point on the resistive sheet.

13. The sensor of claim 12 wherein the means for contacting the resistive sheet and the sheet of conductive mateirial is a pointed probe for pressing the resistive sheet into contact with the sheet of conductive material at a point by deforming the layer of deformable insulation at that point.

14. The sensor of claim 13 further comprising pressure sensitive means connected to the output means whereby output signals are produced only when pressure between the resistive sheet and the sheet of conductive material exceeds a preselected value.

15. The sensor of claim 14 wherein the pressure sensitive means comprises an operational amplifier, with an applied bias, connected between the resistive sheet and the sheet of conductive material to compare the contact resistance between the resistive sheet and the sheet of conductive material as pressure is applied by the probe with a preselected resistance value equivalent to the bias whereby the potentials proportional to the x and y planar coordinates at a point are applied to the output means only when the contact resistance is less than the preselected value.

16. The sensor of claim 14 wherein the pressure sensitive means comprises a normally open pressure sensitive electrical switch within the probe connected in series with the output means whereby output signals are produced only when the pressure applied by the probe exceeds a preselected value to thereby close the pressure sensitive switch.

* * * * *